United States Patent
Li et al.

(10) Patent No.: US 8,190,318 B2
(45) Date of Patent: May 29, 2012

(54) POWER MANAGEMENT SYSTEMS AND METHODS IN A HYBRID VEHICLE

(75) Inventors: Yaoyu Li, Franklin, WI (US); Yosuke Ishikawa, Farmington Hills, MI (US)

(73) Assignees: The UWM Research Foundation, Inc., Milwaukee, WI (US); Honda Motor Co., Ltd., Tokyo (JP)

( * ) Notice: Subject to any disclaimer, the term of this patent is extended or adjusted under 35 U.S.C. 154(b) by 489 days.

(21) Appl. No.: 12/420,689

(22) Filed: Apr. 8, 2009

(65) Prior Publication Data
US 2009/0259363 A1    Oct. 15, 2009

Related U.S. Application Data

(60) Provisional application No. 61/044,983, filed on Apr. 15, 2008.

(51) Int. Cl.
*B60L 9/00* (2006.01)
*B60W 20/00* (2006.01)

(52) U.S. Cl. ............. 701/22; 180/65.265; 180/65.21; 180/65.1

(58) Field of Classification Search .......... 701/22, 701/25, 27, 36, 117, 200–202, 207, 213, 701/408, 409, 400; 180/65.1, 65.21, 65.27–65.29, 180/65.31
See application file for complete search history.

(56) References Cited

U.S. PATENT DOCUMENTS

| | | | | |
|---|---|---|---|---|
| 5,778,326 A * | 7/1998 | Moroto et al. | ............ | 701/22 |
| 6,381,522 B1 * | 4/2002 | Watanabe et al. | ............ | 701/22 |
| 6,549,832 B2 * | 4/2003 | Nakasako et al. | ............ | 701/22 |
| 6,907,948 B2 * | 6/2005 | Wakashiro et al. | ........ | 180/65.25 |
| 2002/0188387 A1 * | 12/2002 | Woestman et al. | ............ | 701/22 |
| 2005/0228553 A1 * | 10/2005 | Tryon | ............ | 701/22 |
| 2007/0010933 A1 * | 1/2007 | Hochkirchen et al. | ........ | 701/117 |
| 2008/0021628 A1 * | 1/2008 | Tryon | ............ | 701/99 |
| 2008/0027639 A1 * | 1/2008 | Tryon | ............ | 701/209 |
| 2008/0262668 A1 * | 10/2008 | Yamada | ............ | 701/22 |
| 2008/0300743 A1 * | 12/2008 | Conlon et al. | ................. | 701/22 |
| 2008/0319597 A1 * | 12/2008 | Yamada | ............ | 701/22 |
| 2009/0259355 A1 * | 10/2009 | Li | ............ | 701/22 |
| 2010/0042304 A1 * | 2/2010 | Naik et al. | ............ | 701/70 |
| 2010/0179714 A1 * | 7/2010 | Tani et al. | ............ | 701/22 |
| 2010/0185384 A1 * | 7/2010 | Naito et al. | ............ | 701/200 |
| 2011/0066308 A1 * | 3/2011 | Yang et al. | ............ | 701/22 |

(Continued)

OTHER PUBLICATIONS

Gong, Q., et al., Proposal—Honda Initiator Grant, Trip Based Power Management of Plug-in Hybrid Electric Vehicle with Two-Scale Dynamic Programming, University of Wisconsin Milwaukee, 8 pages, Quarter 4 2007.

(Continued)

*Primary Examiner* — John Nguyen
*Assistant Examiner* — Michael Ng
(74) *Attorney, Agent, or Firm* — Michael Best & Friedrich LLP

(57) ABSTRACT

A system and method of determining and applying power split ratios to power sources within hybrid vehicles. The power split ratio is determined using a two-scale dynamic programming technique to achieve optimal state of charge depletion over the course of a trip. On the macro-scale level, a global state of charge profile is created for the entire trip. On the micro-scale level, the state of charge profile and accompanying power split ratio is recalculated at the end of each segment as the vehicle proceeds along the trip. Various trip modeling techniques are used to provide constraints for the dynamic programming.

25 Claims, 8 Drawing Sheets

U.S. PATENT DOCUMENTS

| | | | |
|---|---|---|---|
| 2011/0109158 A1* | 5/2011 | Olsen | 307/10.1 |
| 2011/0172867 A1* | 7/2011 | Yu et al. | 701/22 |
| 2011/0196559 A1* | 8/2011 | Preuss | 701/22 |
| 2011/0288712 A1* | 11/2011 | Wang et al. | 701/22 |

OTHER PUBLICATIONS

Eaton Presentation, Trip Based Optimal Power Management for Plug-in Hybrid Electric Vehicles, Yaoyu Li and Zhong-Ren Peng, and Qiuming Gong, University of Wisconsin Milwaukee, 59 slides, Nov. 30, 2007.

Presentation, HIG: Trip Based Optimal Power Management for Plug-in Hybrid Electric Vehicles, Monthly Project Progress Report, Qiuming Gong, Yaoyu Li, and Zhong-Ren Peng, University of Wisconsin Milwaukee, 56 slides, Dec. 7, 2007.

Presentation, HIG: Trip Based Optimal Power Management for Plug-in Hybrid Electric Vehicles, Project Progress Report (II), Qiuming Gong, Yaoyu Li, and Zhong-Ren Peng, University of Wisconsin Milwaukee, 47 slides, Jan. 31, 2008.

Presentation, Trip Based Optimal Power Management for Plug-in Hybrid Electric Vehicles, Qiuming Gong, Yaoyu Li, Zhong-Ren Peng, University of Wisconsin Milwaukee, 64 slides, Feb. 2008.

Presentation, Trip Based Optimal Power Management for Plug-in Hybrid Electric Vehicles, Qiuming Gong, Yaoyu Li, Zhong-Ren Peng, University of Wisconsin Milwaukee, 69 slides, Feb. 8, 2007.

Presentation, HIG: Trip Based Optimal Power Management for Plug-in Hybrid Electric Vehicles, Monthly Project Progress Report, Qiuming Gong, Yaoyu Li, and Zhong-Ren Peng, University of Wisconsin Milwaukee, 32 slides, Feb. 28, 2008.

Presentation, SAE Conference, Trip Based Optimal Power Management for Plug-in Hybrid Electric Vehicles, Qiuming Gong, Yaoyu Li, Zhong-Ren Peng, University of Wisconsin Milwaukee, 60 slides, Apr. 15, 2008.

Presentation, HIG: Trip Based Optimal Power Management for Plug-in Hybrid Electric Vehicles, Monthly Project Progress Report, Qiuming Gong, Yaoyu Li, and Zhong-Ren Peng, University of Wisconsin Milwaukee, 40 slides, Apr. 14, 2008.

Manuscript, Trip Based Optimal Power Management for Plug-in Hybrid Electric Vehicles, Honda Initiation Grant 2007 Full-Proposal Submission, Yaoyu Li and Zhong-Ren Peng, University of Wisconsin Milwaukee, 32 pages, Quarter 3 2007.

Manuscript, Trip Based Optimal Power Management for Plug-in Hybrid Electric Vehicles, Honda Initiation Grant 2007 Pre-Proposal Submission, Yaoyu Li and Zhong-Ren Peng, University of Wisconsin Milwaukee, 9 pages, Quarter 3 2007.

Gong, Q., et al., Pre-Proposal—Honda Initiator Grant Proposal, Trip Based Power Management of Plug-in Hybrid Electric Vehicle with Two-Scale Dynamic Programming, University of Wisconsin Milwaukee 5 pages, Quarter 4 2007.

Lin, Chan-Chiao, et al., "Power Management Strategy for a Parallel Hybrid Electric Truck," IEEE Transactions on Control Systems Technology, vol. 11, No. 6, pp. 839-849, Nov. 2003.

Powell, B. K., et al., "Dynamic Modeling and Control of Hybrid Electric Vehicle Powertrain Systems," IEEE Control Systems Magazine, pp. 17-33, Oct. 1998.

Baumann, Bernd, M., et al. "Mechatronic Design and Control of Hybrid Electric Vehicles," IEEE/ASME Transactions on Mechatronics, vol. 5, No. 1, pp. 58-72, Mar. 2000.

Emadi, Ali, et al., "Topological Overview of Hybrid Electric and Fuel Cell Vehicular Power System Architectures and Configurations," IEEE Transactions on Vehicular Technology, vol. 54, No. 3, pp. 763-770, May 2005.

Duoba, Michael, "Evaluating PHEV Technology Using Component HIL, Subsystem, and Chassis Dynamometer Testing: Methods and Results," Presented at SAE Hybrid Vehicle Technologies 2007 Symposium, San Diego, CA, Feb. 7-8, 2007.

Jeon, Soon-Il, et al., "Multi-Mode Driving Control of a Parallel Hybrid Electric Vehicle Using Driving Pattern Recognition," Journal of Dynamic Systems, Measurement and Control, Transactions of the ASME, vol.124, pp. 141-149, Mar. 2002.

Langari, Reza, et al., "Intelligent Energy Management Agent for a Parallel Hybrid Vehicle—Part I: System Architecture and Design of the Driving Situation Identification Process," IEEE Transactions on Vehicular Technology, vol. 54, No. 3, pp. 925-934, May 2005.

Won, Jong-Seob, et al., "Intelligent Energy Management Agent for a Parallel Hybrid Vehicle—Part II: Torque Distribution, Charge Sustenance Strategies, and Performance Results," IEEE Transactions on Vehicular Technology, vol. 54, No. 3, pp. 935-953, May 2005.

Delprat, Sebastien, et al. "Control of a Parallel Hybrid Powertrain: Optimal Control," IEEE Transactions on Vehicular Technology, vol. 53, No. 3, pp. 872-881, May 2004.

Sciarretta, Antonio, et al., "Optimal Control of Parallel Hybrid Electric Vehicles," IEEE Transactions on Control Systems Technology, vol. 12, No. 3, pp. 352-363, May 2004.

Brahma, A., et al., "Optimal Energy Management in Series Hybrid Electric Vehicles," Proceedings of the American Control Conference, Chicago, IL, pp. 60-64, Jun. 2000.

Perez, Laura, V., et al., "Optimization of Power Management in an Hybrid Electric Vehicle Using Dynamic Programming," Mathematics and Computers in Simulation, Science Direct, 2006.

Koot, Michiel, et al., "Energy Management Strategies for Vehicular Electric Power Systems," IEEE Transactions on Vehicular Technology, vol. 54, No. 3, pp. 771-782, May 2005.

Musardo, Cristian, et al., "A-ECMS: An Adaptive Algorithm for Hybrid Electric Vehicle Energy Management," European Journal of Control, vol. 11, pp. 509-524, 2005.

PCT/US09/39947 International Search Report and Written Opinion of the International Searching Authority mailed Jun. 4, 2009, 12 pages.

Office Action from the United States Patent Office for U.S. Appl. No. 12/420,643 dated Dec. 23, 2011 (10 pages).

* cited by examiner

POWER MANAGEMENT SYSTEMS AND METHODS IN A HYBRID VEHICLE

RELATED APPLICATIONS

This application claims priority to provisional application 61/044,983 filed Apr. 15, 2008.

BACKGROUND

The present invention relates to hybrid vehicles and systems and methods of determining and applying power split ratios to power sources within hybrid vehicles.

SUMMARY

In one embodiment, the invention provides a hybrid vehicle comprising a drive train; an electric power source coupled to the drive train and including an electric energy storage device having a state of charge; a non-electric power source coupled to the drive-train; and a control system for controlling the transfer of power from the electric power source and the non-electric power source to the drive train. The control system comprises software stored on a computer readable medium for effecting the steps of establishing a power split ratio between the electric power source and the non-electric power source for a defined trip route so that the state of charge reaches a defined threshold at the end of the trip route, dividing the trip route into a series of trip segments, receiving data from an information database, the data relating to historic or real-time conditions of each trip segment, and recalculating the power split ratio for each trip segment based on the data.

In another embodiment the invention provides a method of a hybrid vehicle comprising a drive train, an electric power source coupled to the drive train and including an electric energy storage device having a state of charge, a non-electric power source coupled to the drive-train; and a control system for controlling the transfer of power from the electric power source and the non-electric power source to the drive train. The control system comprises software stored on a computer readable medium for effecting the steps of establishing a power split ratio between the electric power source and the non-electric power source for a defined trip route so that the state of charge reaches a defined threshold at the end of the trip route, determining the state of charge at various points along the trip route as the vehicle proceeds along the trip route, recognizing driving patterns at multiple points along the trip route as the vehicle proceeds along the trip route, and recalculating the power split ratio at the various points along the trip route to ensure that the state of charge approximately reaches the defined threshold when the vehicle reaches the end of the trip route. The power split ratio is recalculated based on the recognized driving patterns as the vehicle proceeds along the trip route.

In another embodiment the invention provides a method of controlling a hybrid vehicle comprising the steps of retrieving trip data, determining a trip route based on the trip data, dividing the trip route into (n) segments, modeling each of the (n) segments of the trip route to determine a driving cycle along the trip route for the hybrid vehicle (wherein at least one segment is modeled using a neural network model), determining a global state of charge profile estimating the state of charge at the end of each of the (n) segments such that the state of charge approximately reaches the defined threshold when the vehicle reaches the end of the trip route, determining a power split ratio for each of the (n) segments based on the actual state of charge at the beginning of a segment about to be traversed and the estimated state of charge at the end of the segment about to be traversed, such that the determined power split ratio causes the state of charge to approximately reach the estimated state of charge at the end of the segment about to be traversed, and applying the determined power split ratio for each of the (n) segments.

In another embodiment, the invention provides a method of controlling a hybrid vehicle comprising the steps of retrieving trip data, determining a trip route based on the trip data, dividing the trip route into (n) segments, determining a global state-of-charge profile estimating the state of charge at the end of each of the (n) segments such that the state of charge approximately reaches the defined threshold when the vehicle reaches the end of the trip route, establishing a power split ratio for each of the (n) segments based on the global state-of-charge profile, receiving data from an information database, the data relating to historic or real-time conditions of each trip segment, recalculating the power split ratio for each of the (n) segments based on the data, and applying the recalculated power split ratio for each of the (n) segments.

In another embodiment, the invention provides a method of controlling a hybrid vehicle comprising the steps of retrieving trip data, determining a trip route based on the trip data, dividing the trip route into (n) segments, determining a global state-of-charge profile estimating the state of charge at the end of each of the (n) segments such that the state of charge approximately reaches the defined threshold when the vehicle reaches the end of the trip route, establishing a power split ratio for each of the (n) segments based on the global state-of-charge profile, recognizing driving patterns at multiple points along the trip route as the vehicle proceeds along the trip route, recalculating the power split ratio for each of the (n) segments based on the recognized driving patterns, and applying the recalculated power split ratio for each of the (n) segments.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

As is apparent to those of ordinary skill in the art, the systems shown in the figures are models of what actual systems might be like. Many of the modules and logical structures described are capable of being implemented in software executed by a microprocessor or a similar device or of being implemented in hardware using a variety of components including, for example, application specific integrated circuits ("ASICs"). Terms like "controller" or "module" may include or refer to both hardware and/or software. Furthermore, throughout the specification capitalized terms are used. Such terms are used to conform to common practices and to help correlate the description with the coding examples, equations, and/or drawings. However, no specific meaning is implied or should be inferred simply due to the use of capitalization. Thus, the claims should not be limited to the specific examples or terminology or to any specific hardware or software implementation or combination of software or hardware.

Hybrid vehicles use more than one type of power source for providing power to the vehicle's drive train. Different types of power sources include, for example, internal combustion engines, electric motors, and hydraulic accumulators. These power sources can be fueled by various types of batteries, fuel cells, petroleum products (e.g., gasoline), biofuels, etc.

In power-split hybrid vehicles, the power sources work together to directly provide driving power to the drive train. In contrast, series hybrid vehicles have a first source directly providing driving power to the drive train, and a second source providing power to the first source. For power-split hybrid vehicles, the relative amounts of power provided from the multiple power sources to the drive train is referred to as the power split ratio ("PSR"). In a power splitting hybrid vehicle with two power sources, a PSR of 60%, and a total power demand Ptotal, the following equations apply:

$$P_{total} = P_{source\ 1} + P_{source\ 2}$$

$$P_{source\ 1} = 60\% \times P_{total}$$

$$P_{source\ 2} = 40\% \times P_{total}$$

Determining whether to use PSR (e.g., 60%) or 1-PSR (e.g., 40%) in the $P_{source\ 1}$ equation or the $P_{source\ 2}$ equation is an implementation decision. The selection of a PSR can alter the performance of the vehicle, for instance, the fuel efficiency, torque output, and emission levels.

Figure 1:
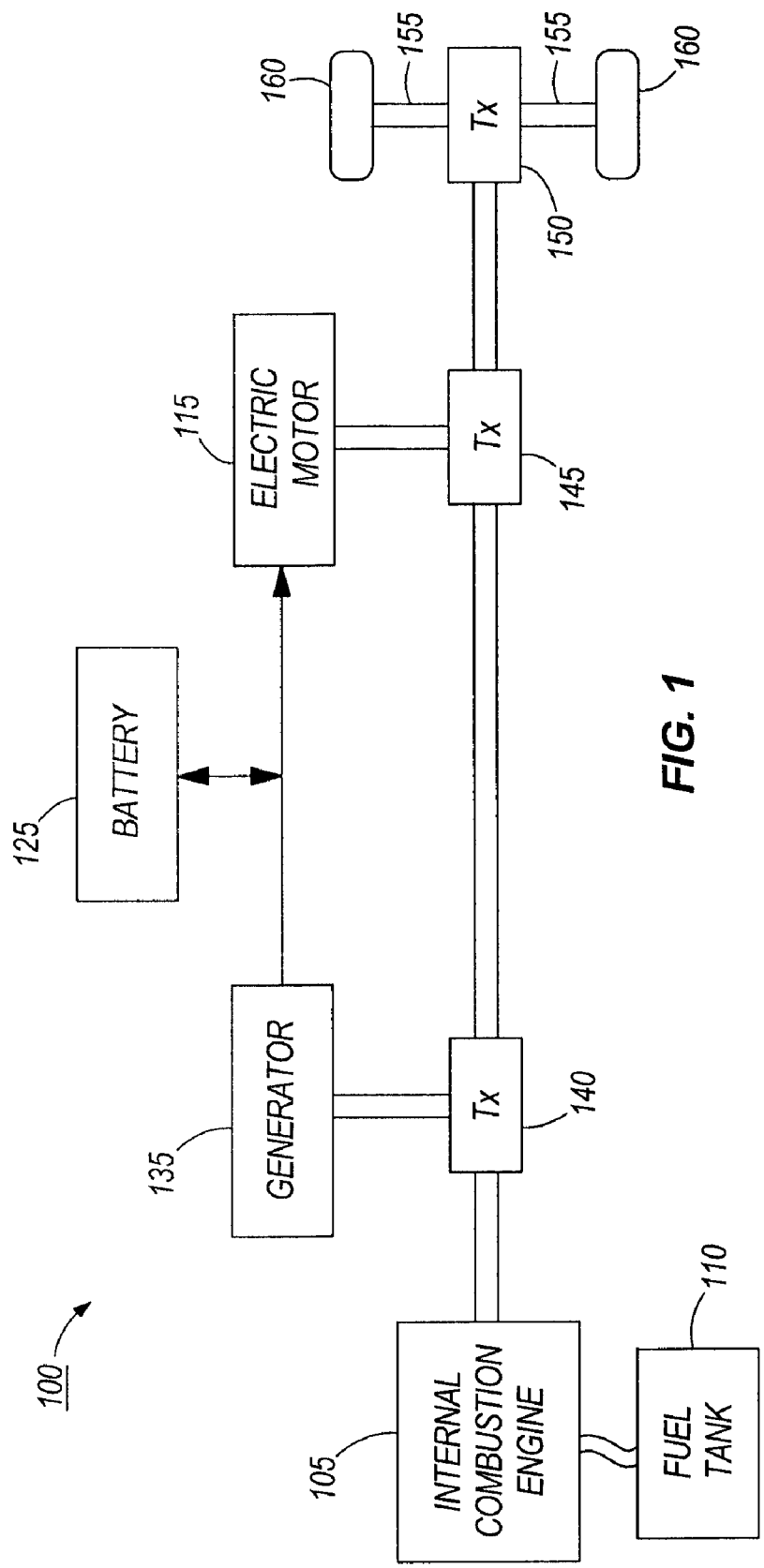
FIG. 1 illustrates an exemplary powertrain for a hybrid vehicle according to an embodiment of the invention.

FIG. 1 depicts a powertrain 100 of an exemplary power-split hybrid vehicle of the invention. A fuel tank 110 provides fuel for an internal combustion engine ("ICE") 105. The ICE 105 is coupled to a transmission 140 that enables the ICE 105 to provide mechanical power to a generator 135 and transmission 145. The generator may provide electrical power to both a battery 125 and an electric motor 115. The battery is capable of receiving and storing electrical power from the generator 135 to increase its total state of charge ("SOC"). The battery 125 is also capable of outputting electrical power to the electric motor 115, which decreases the SOC of the battery 125. The electric motor 115 receives electrical power from the generator 135 and/or the battery 125 and converts it to mechanical power to drive the transmission 145. Thus, the transmission 145 may receive mechanical driving power from both the ICE 105 and the electric motor 115. Thereafter, the transmission 145 provides mechanical driving power to the wheels 160 via transmission 150 and axles 155, which propels the hybrid vehicle. In alternative embodiments, the powertrain provides power to two or more axles. In other embodiments, the powertrain 100 does not include a generator 135 or transmission 140. Therefore, the battery 125 can not be recharged by the ICE 105. Instead, the battery 125 is recharged by solar panels, a main power grid (e.g., via a plug-in connection), or other power sources.

Figure 2:
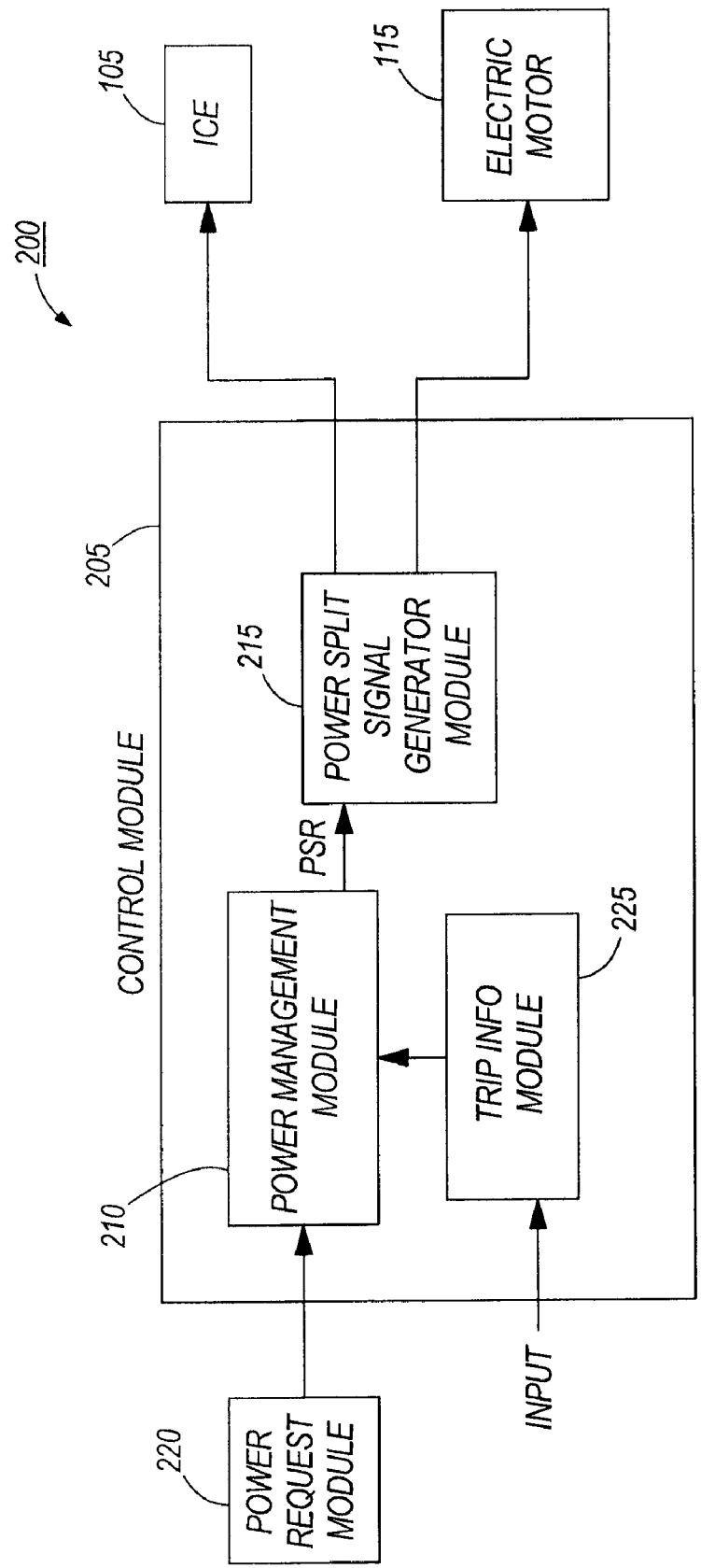
FIG. 2 illustrates an exemplary control system for a hybrid vehicle according to an embodiment of the invention.

FIG. 2 depicts a control system 200 to be used with a powertrain of a power-split hybrid vehicle, such as powertrain 100. The control system 200 includes a Control Module 205 with a Power Management Module 210, Trip Information ("Info") Module 225, and Power Split Signal Generator Module 215. The Control Module 205 receives input from the Power Request Module 220. The Power Request Module 220 can include, for example, an accelerator pedal operated by a driver of the hybrid vehicle. The Power Request Module 220 can convert a mechanical action, such as a depression of the accelerator or brake pedal, into an electronic signal indicating the driver's desired acceleration or deceleration level. The Trip Info Module 225 provides information about the driver's intended and on-going trip. Information received and provided by the Trip Info Module 225 can include destination information, current location information, time of day information, speed information, route information, traffic information, construction information, and a battery's current state of charge ("SOC").

The Power Management Module 210 receives the information output from the Power Request Module 220 and the Trip Info Module 225. The Power Management Module 210 uses the information received to calculate a PSR, which is output to the Power Split Signal Generator 215. The Power Split Signal Generator 215, in turn, calculates the power request amount for each of the ICE 105 and the electric motor 115. The ICE 105 power request can be calculated by multiplying the PSR by the total power request (e.g., 40%×total power request=power request for ICE 105). The electric motor 115 power request can be calculated by multiplying (1-PSR) by the total power request (e.g., 60%×total power request=power request for electric motor 115. Therefore, calculating and applying a PSR to the ICE 105 and electric motor 115 causes the ICE 105 to provide the same power, more power, or less power than the electric motor 115 to propel the hybrid vehicle. In other embodiments, the Power Split Signal Generator Module 225 multiplies the PSR by the total power request to determine the electric motor 115 power request, and multiplies (1-PSR) by the total power request to determine the ICE 105 power request.

Figure 3A:
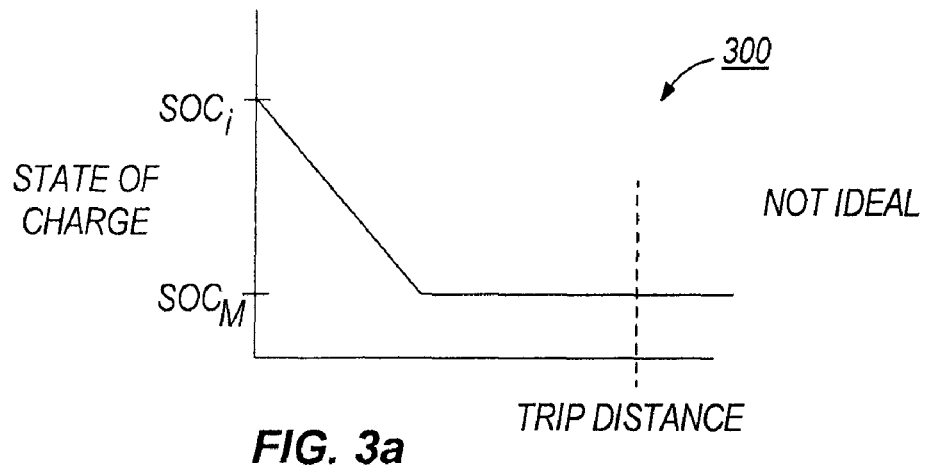
FIGS. 3a-c include graphs depicting the change in a battery's state of charge over the course of a trip for a hybrid vehicle.
Figure 3B:
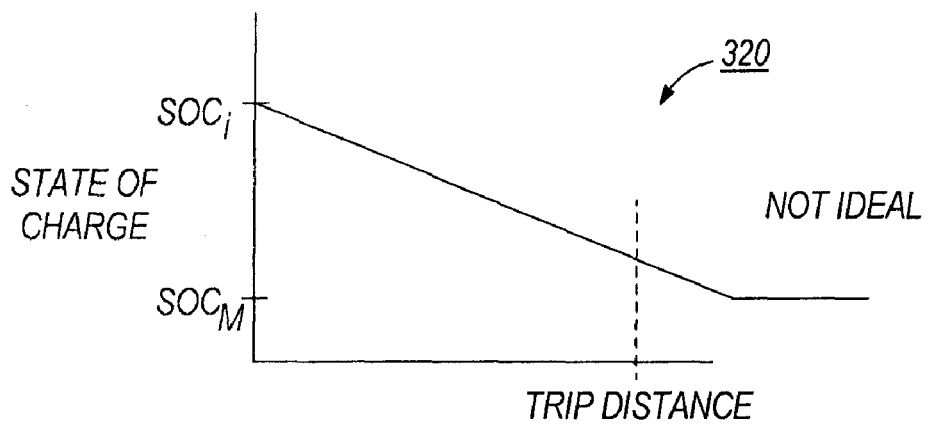
Figure 3C:
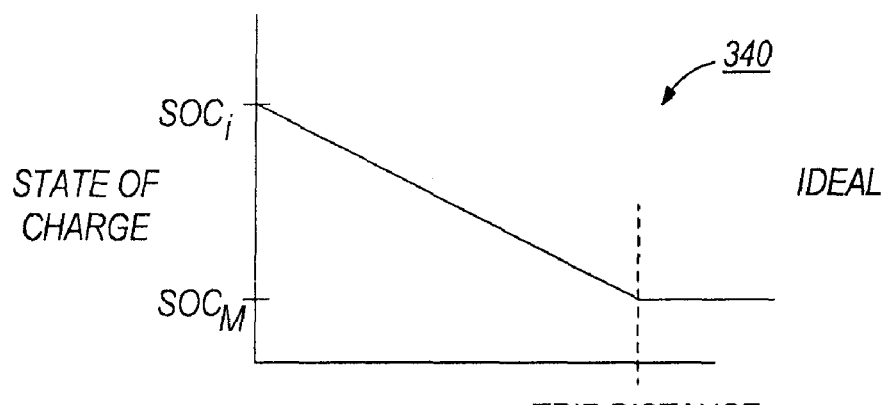

Graphs 300, 320, and 340 of FIGS. 3a-c depict SOC values for a power-split hybrid vehicle battery, such as battery 125, over the course of a trip. The power-split hybrid vehicle for FIGS. 3a-c includes generator 135 to maintain the battery level once it reaches it's lowest healthy SOC level ($SOC_m$). At the beginning of a trip, the initial battery level is at $SOC_i$. In one embodiment, $SOC_m=0.3$ and $SOC_i=0.8$. In FIG. 3a, the battery's SOC is reduced to $SOC_m$ before the end of the trip, forcing the hybrid vehicle to rely more on the ICE 105 to power the vehicle and maintain the battery's SOC. In FIG. 3b, the battery's SOC is not reduced to an $SOC_m$ level at the end of the trip. Therefore, the hybrid vehicle relied on the ICE 105 more than necessary, using more fuel from fuel tank 105.

FIG. 3c depicts the ideal SOC usage over the course of a trip, such that the vehicle will have the most efficient fuel usage. In FIG. 3c, the SOC reaches its lowest healthy level at the end of the trip. Properly chosen PSR levels in accordance with embodiments of this invention will optimize the battery usage such that the battery reaches the $SOC_m$ level at the end of the trip as shown in FIG. 3c.

Figure 4:
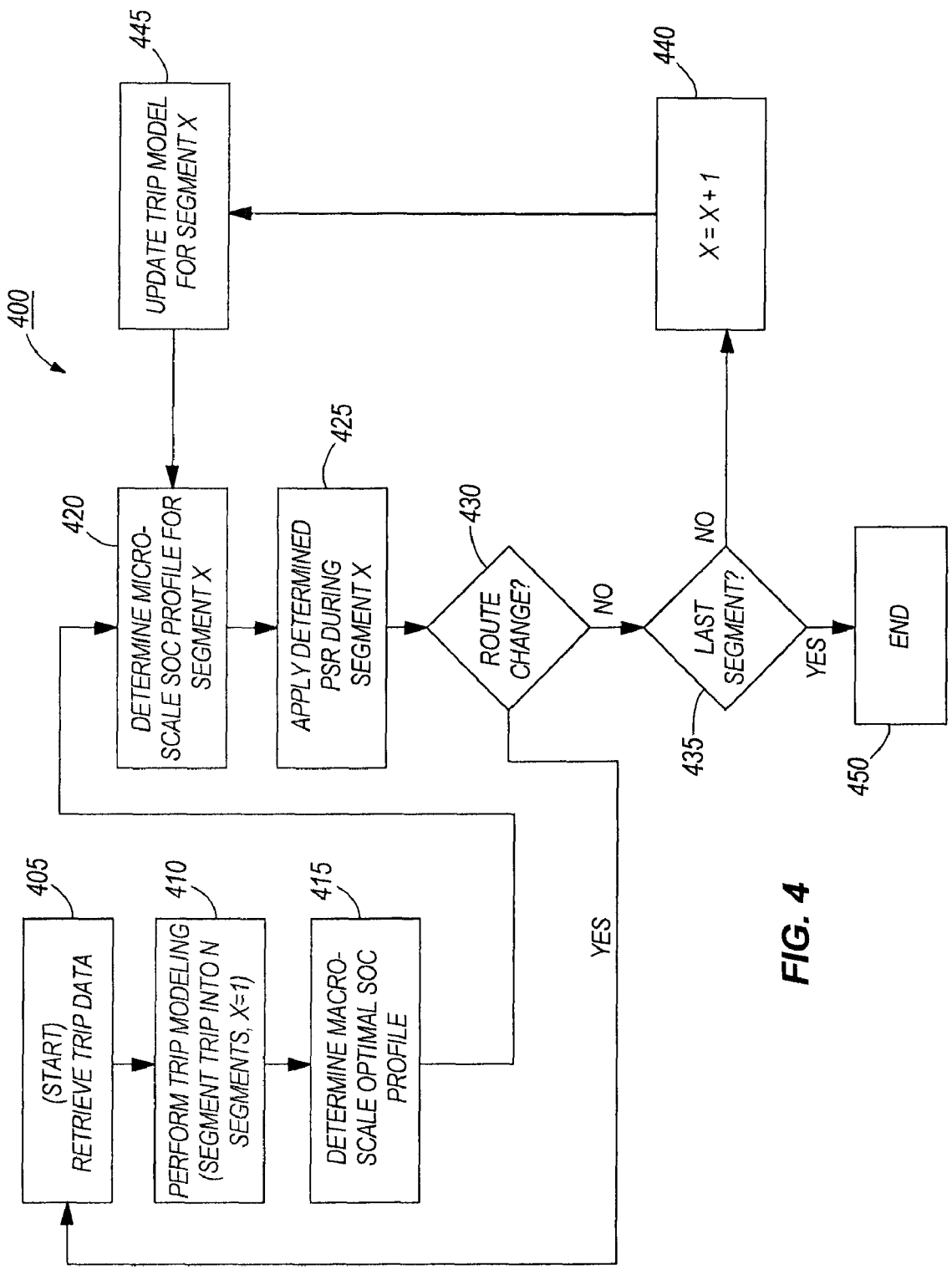
FIG. 4 illustrates an exemplary process for determining and applying a power split ratio according to an embodiment of the invention.

FIG. 4 shows a method 400 that implements two-scale dynamic programming to dynamically calculate optimal PSR levels for a trip in order to achieve the ideal $SOC_m$ level at the end of the trip. The method 400 can be used, for example, by the control system 200 of FIG. 2, and is described with reference thereto. Before starting a trip, a user, such as a driver, passenger, or third party, enters trip data into the Trip Info Module 225 (step 405). The data can include one or more trip destinations (e.g., through longitude and latitude coordinates, cross streets, an address, etc.) and an estimated departure time (which can be assumed the current time unless otherwise specified).

Next, the Trip Info Module 225 performs trip modeling to find the driving cycle for the trip given the origin, destination, and estimated departure time of the trip (step 410). The driving cycle includes, for example, vehicle speed, trip time, and acceleration/deceleration rates at each point along the trip. A path-finding algorithm, such as those available via Geographic Information Systems (GIS), will be used to find a route from the origin to the destination. The path-finding algorithm will determine a route based on some or all of the following: road segment lengths, speed limits, historical and real-time traffic data, road slope, intersection/traffic light distribution, and estimated time of departure.

In one embodiment, once a route is determined, the trip is segmented into a number (n) of segments. There are different ways to segment the trip. For instance, a new segment can be created at each traffic signal (e.g., stop light and stop sign), at each speed limit change (e.g., from 30 mph to 40 mph), at each turn along the route, at any combination of these, or at equidistant locations along the route. The vehicle speed, segment time, and acceleration/deceleration rates are determined for each segment according to a chosen trip modeling approach. Different trip modeling schemes include a simple model, a Gipps car following model, an actual or historic data model, a gas-kinetic model, and a neural network model.

Figure 7:
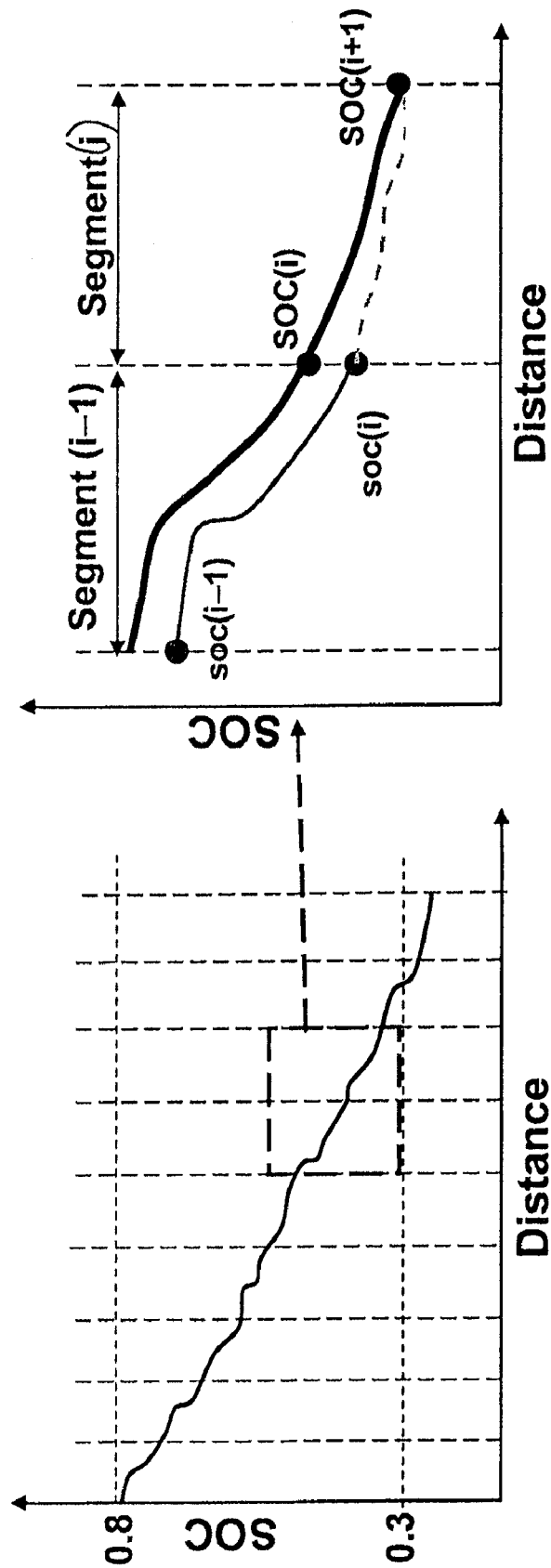
FIGS. 7a-b illustrate estimated and actual state of charge depletion over the course of a trip according to an embodiment of the invention.

In step 415, the control system 200 calculates a macro-scale optimal SOC profile for the entire trip, an example of which is shown in FIG. 7a. In FIG. 7a, SOCi is 0.8 and SOCm is 0.3. The resulting macro-scale SOC trajectory will include an estimated ending SOC level (SOC(x)) for each of the n segments (see, e.g., SOC(i) and SOC(i+1) in FIG. 7b). The SOC(x) level for each segment end will be used as reference points throughout the trip to ensure the SOC decreases approximately at an optimal rate (i.e., like that shown in FIG. 3c). Calculating the macro-scale optimal SOC profile will be described in more detail below with respect to FIG. 8.

In another embodiment, one or both of steps 410 and 415 are implemented by a computational device that is not onboard the hybrid vehicle. That is, the trip information may be sent from the control system or another device to a computational device that performs the trip modeling (step 410), calculates a macro-scale optimal SOC profile (step 415), and then transmits the resulting data to the hybrid vehicle control system 200 wirelessly.

In step 420, real-time optimization with a micro-scale dynamic programming ("DP") occurs with respect to the first segment of the trip. The initial SOC value (soc(0)) and the predicted SOC value for the end of segment 1 (SOC(1)), along with updated route information, will be used to calculate an optimal PSR value for the first segment such that the predicted SOC(1) is met as the hybrid vehicle reaches the end of that trip segment. The updated route information can include historical or, preferably, real-time vehicle speed information along the segment in question (in this case, segment 1). With the updated driving cycle information, a dynamic programming optimization algorithm is executed to calculate the optimal PSR level for that segment. In step 425, the control system 200 applies the calculated PSR value and the hybrid vehicle travels the first segment of the trip. If (while the hybrid vehicle is traveling) the control system determines that the user has altered the trip destination or the trip route has changed (step 430), the method restarts at step 405.

If the trip destination and trip route have not changed, as the hybrid vehicle nears the end of the first segment, the control system 200 determines whether any additional trip segments remain (step 435). The control system 200 can determine that the vehicle is nearing the end of a segment based on, for example, a GPS device or other navigation tools. If additional segments remain, the segment value x is increased by one (step 440). Thereafter, Trip Info Module 225 performs an update of the trip model for the next segment of the trip (segment 2) in step 445. Any of the trip modeling schemes described herein may be used for performing the update in step 445. The control system then implements step 420 for segment 2 using the actual SOC(1) value as the initial SOC value and the predicted SOC(2) value to determine an optimal PSR value for the second segment. FIG. 7b depicts two segments of the trip, the segment (i−1) which has been completed, and the segment (i), which is about to begin. The solid bold SOC(i) line represents the macro-scale optimal SOC profile. The solid bold SOC(i) line represents the actual SOC level during the i−1 segment. The dashed thin SOC(i) line represents the micro scale SOC level over the segment (i) resulting from the dynamic programming of step 420 for segment (i).

The method repeats the steps 420-440 to continuously update (in other words, recalculate) and apply the PSR value for each segment until no more segments remain (x=n in step 435) and the trip is complete (step 450), or the trip destination or trip route has changed (step 430) and the process restarts.

Trip Modeling

If historical and real-time traffic flow data are not available for a given road segment, then a simple modeling scheme (such as constant acceleration/deceleration and constant speed (assumed equal to the speed limit)) can be used. Currently, historical and real-time traffic flow data is often not available on local roads.

In this simple modeling scheme, traffic sign and signal delays can also be considered. Such traffic sign and signal data is available from local transportation agencies (e.g., Geographical Information Systems (GIS)), and can be quickly transmitted to the vehicle control system 200 in real-time or pre-stored in the on-board memories. In some embodiments, the trip model will assume the vehicle will stop at each traffic signal for a set amount of time (e.g., 30 seconds) and each stop sign for a set amount of time (e.g., 3-5 seconds). In other embodiments, the trip modeling can be synchronized with traffic signal sequences also available from local transportation administrations. The synchronization allows a more accurate model, where the vehicle does not stop at each traffic signal. The traffic signal sequence provides the trip model with the timing for green, yellow, and red lights. The trip model can estimate the vehicle stopping distance on each road segment, given the speed limit and estimated deceleration rate, and then determine whether the car will have to stop at any given traffic signal.

The microscopic Gipps car following model (the "Gipps model") can increase the accuracy of the driving cycle relative to the simple modeling. The Gipps model is well-suited to model local road segments (road portion between traffic signals) of a trip. In particular, the Gipps model describes the process by which drivers follow each other in traffic streams, i.e., the interaction between vehicles in the same lane. The Gipps model assumes the availability of position and speed information for all vehicles on a road segment by way of navigation devices, such as GPS transmitting devices. The Gipps model, for purposes of this discussion, combines the safety distance model of Gipps, an action point model (which considers driver reaction times), and the traffic signal synchronization modeling as described above. In this Gipps model, all the drivers are assumed to have the same reaction time and each vehicle has the same length.

Using the Gipps model, the following steps are executed to determine the driving cycle along a road segment for the hybrid vehicle, where (n) vehicles are on the road segment:

1) When the vehicle enters the road segment, update the vehicle map and traffic signal sequences from a traffic management center (TMC). K=2.
2) Predict the trip model of the leading car (vehicle 1) with the traffic signal synchronization.
3) Predict the driving cycle for the following vehicle (vehicle k) using the Gipps car following model. Determine whether the vehicle (k) will stop before the next traffic light. If so, go to step 4. Otherwise go to step 5.
4) Set vehicle (k) to be the new leading car. Go to step 1.
5) Check if the trip prediction is done for all (n) vehicles (k=n?). If so, go to step 6. Otherwise, set (k=k+1), go to step 3.
6) After the above steps, all (n) vehicles trip predictions of the current local road segment are finished. End the process for the current road segment.

Historical traffic data or real-time traffic data offer an alternative to the simple modeling and Gipps modeling schemes. Historical traffic data may include archived information such as average speed on a road at a given date and time. Real-time traffic data may include average speed at the approximate moment of the information request. Historical and real-time traffic data are available for most metropolitan freeways, e.g., via the Intelligent Transportation System (ITS) archives and real-time monitoring systems. In using the historic and real-time traffic modeling, the driving cycle velocity of a given point on the road segment is the average speed retrieved from the historic or real-time data systems. For the road segment between two data points, a straight line increase or decrease in velocity is assumed. That is, the model assumes constant acceleration and deceleration between data points.

In some embodiments, different trip modeling techniques are used for on and off ramps for freeways to improve the accuracy of the resulting driving cycle for the on and off ramps. In one embodiment, a gas-kinetic trip modeling is implemented along freeway on/off ramps to provide more accurate driving cycles at such junctions.

Figure 5:
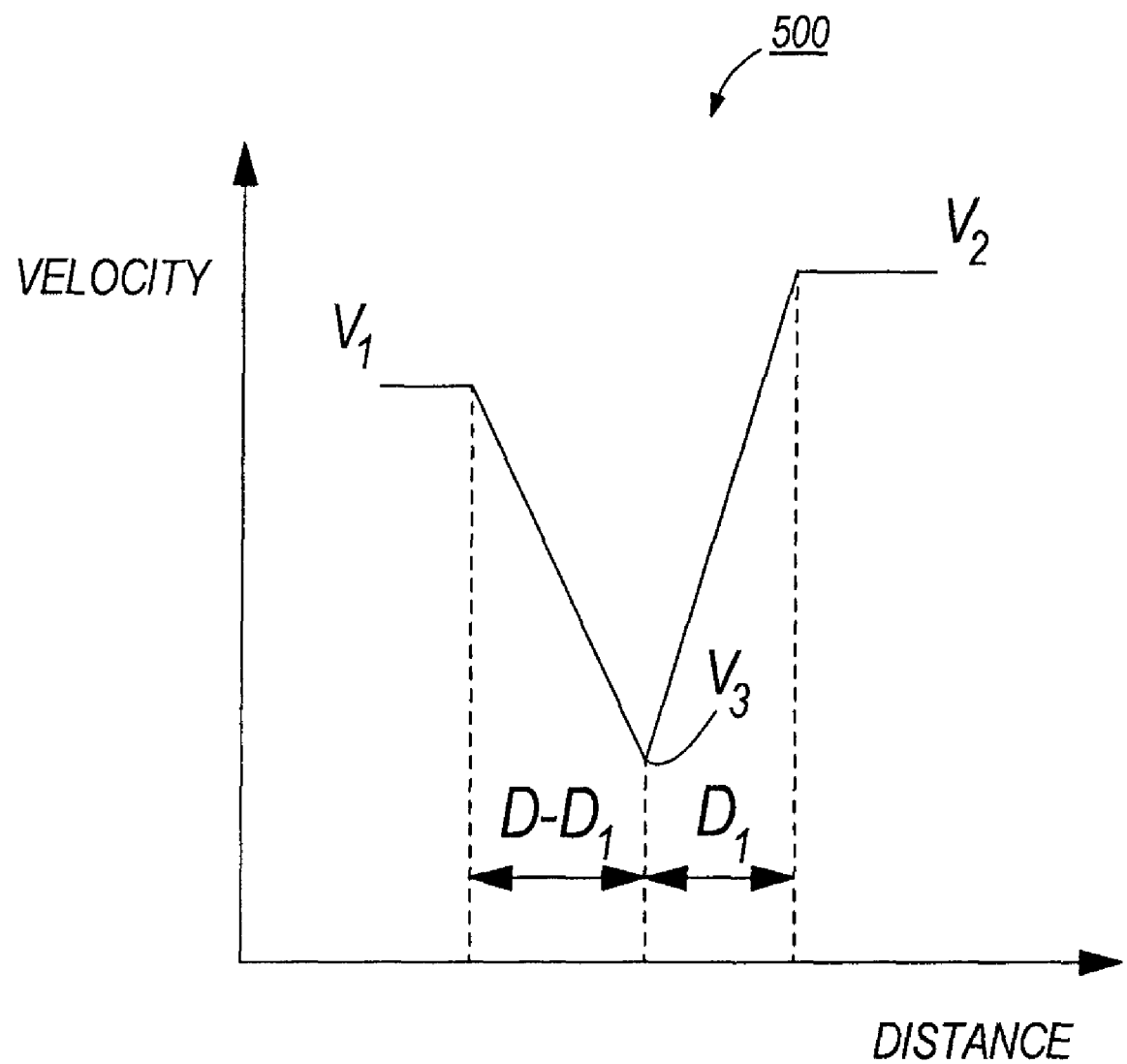
FIG. 5 illustrates a typical driving cycle for a vehicle on a on/off ramp of a freeway.

In another embodiment, the trip model near on and off ramps uses a Multi-layer Perceptron (MLP) type neural network using field recorded traffic data. The neural network approach is a less complex trip model than the gas-kinetic model. FIG. 5 depicts the typical driving cycle for a vehicle near freeway on and off ramps in graph 500. The vehicle starts with an approximated speed $V_1$ (upstream speed), which is reduced to $V_3$ (valley speed) as the vehicle approaches other vehicles on the on or off ramp due to the mixing of inflow traffic. After passing the mixing portion, the vehicle can accelerate until it reaches $V_2$ (downstream speed). D is the distance between two main road detectors, and $D_1$ is the distance between the valley speed location and the downstream main road detector.

Figure 6:
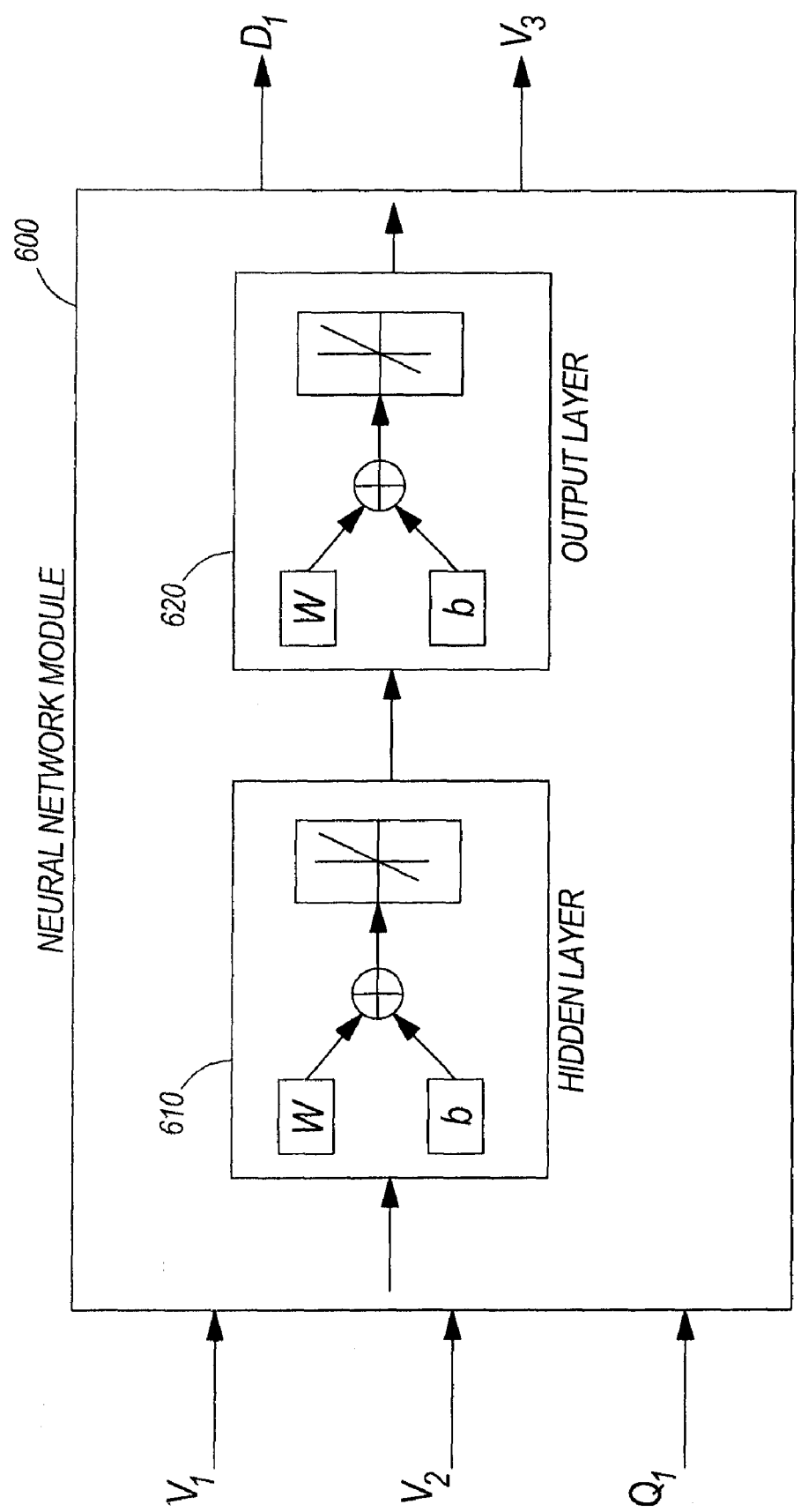
FIG. 6 illustrates an exemplary Neural Network Module according to an embodiment of the invention.

FIG. 6 depicts a diagram for a MLP Neural Network Module 600 for trip modeling on and off ramps. The MLP Neural Network Module 600 has a hidden layer 610 and an output layer 620. The MLP Neural Network Module also has three inputs ($V_1$, $V_2$, and $Q_1$) and two outputs ($D_1$ and $V_3$), where $Q_1$ is ramp flow. The training data for the neural network can be obtained by combining the freeway portion of the actual speed profile along with the ramp flow data from traffic sensor data (i.e., from an ITS) retrieved from sensors near the on and off ramps. The back-propagation algorithm is then applied to obtain the model parameters. Thereafter, the model is validated.

In some embodiments, the trip plan modeling uses a combination of these techniques, for example, the above-described simplified approach or application of the Gipps model for local road segments, the historical traffic data or real-time traffic data for freeway/highway segments, and the neural network model for freeway on/off ramps. The simple model, Gipps model, historical traffic model, and real-time traffic model may be used exclusively or in any combination for trip modeling systems in other embodiments of the invention.

Dynamic Programming

For a given driving cycle (determined by trip modeling), the goal of the control system 200 is to minimize the fuel consumption, while meeting the speed and torque demand for the vehicle operation. Such an optimization process can be performed by dynamic programming with constraints including the dynamic model for vehicle propulsion and the operational limits of individual components.

In the discrete-time format, the hybrid vehicle model can be expressed as $$x(k+1) = f[x(k), u(k)]$$

where $x(k)$ is the state vector of the system (e.g., vehicle speed, transmission gear number, and battery SOC) and $u(k)$ is the vector of control variables (e.g., desired output torque from the engine, desired output torque from the motor, and gear shift command to the transmission). The optimization problem is to find the control input $u(k)$ to minimize the following cost function:

$$J = \sum_{k=0}^{N-1} L[x(k), u(k)] = \sum_{k=0}^{N-1} [\text{fuel}(k)]$$

where N is the duration of the driving cycle, L is the instantaneous cost referring to the fuel consumption (engine emissions are not considered in this equation).

During the optimization process, the following inequality and equality constraints are satisfied to meet the speed and torque demands and to ensure a safe and smooth operation of the engine, battery, and motor:

Motor Speed: $\omega_{m\_min} \leq \omega_m(k) \leq \omega_{m\_max}$

Motor Torque: $T_{m\_min}[\omega_m(k), SOC(k)] \leq T_m(k) \leq T_{m\_min}[\omega_m(k), SOC(k)]$ ICE Speed: $\omega_{e\_min} \leq \omega_e(k) \leq \omega_{e\_max}$ ICE Torque: $T_{e\_min}[\omega_e(k)] \leq T_e(k) \leq T_{e\_max}[\omega_e(k)]$ State of Charge: $SOC_{min} \leq SOC(k) \leq SOC_{max}$ Vehicle Speed: $v_v(k) = v_{v\_req}(k)$ Torque Demand: $T_m(k) + T_e(k) = T_{req}(k)$ As mentioned above, this optimization process can be performed by using a dynamic programming (DP) algorithm.

The dynamic programming (DP) algorithm is used to determine the macro-scale optimal SOC profile and PSR values. Dynamic Programming (DP) is a general dynamic optimization approach that can provide a globally optimal solution to a constrained nonlinear programming problem. Based on Bellman's Principle of Optimality, the optimal policy can be obtained by solving the sub-problems of optimization backward from the terminal condition.

The sub-problem for the (N−1) step is to minimize:

$$J^*_{N-1}[x(N-1)] = \min_{u(N-1)} \{L[x(N-1), u(N-1)] + G[x(N)]\}$$

For step k (0<k<N−1), the sub-problem is to minimize:

$$J^*_k[x(k)] = \min_{u(k)} \{L[x(k), u(k)] + J^*_{k+1}[x(k+1)]\}$$

and the cost function to be minimized is defined by:

$$J = \sum_{k=0}^{N-1} L[x(k), u(k)] = \sum_{k=0}^{N-1} [\text{fuel}(k) + \mu \cdot NOx(k) + v \cdot PM(k)]$$

$J_k^*[x(k+1)]$ is the optimal cost-to-go function at state x(k) starting from time stage k. The above recursive equation is solved backward to find the control policy. The minimizations are performed subject to the inequality and equality constraints imposed by the driving cycle determined via trip modeling and depicted above.

An effective way to solve the above cost function numerically is through quantization and interpolation. For continuous state space and control space, the state and control values are first discredited into finite grids. At each step of the optimization search, the function $J_k[x(k)]$ is evaluated only at the grid points of the state variables. If the next state x(k+1) does not fall exactly on a quantized value, then the value of $J_k^*[x(k+1)]$ as well as G[x(N)] are determined through linear interpolation. At each step, the backward DP with interpolation method was used. For some cases, the vehicle can be assumed fully charged to the highest healthy level, typically SOC of 0.8, while the healthy low level of SOC is 0.3. In these instances, the DP problem is solved with the initial and terminal values of SOC at 0.8 and 0.3, respectively, as boundary conditions.

Solving the DP in the time domain, as described above, can be computationally complex and may require computational power in excess of that available in some on-board vehicle control systems 200. In these instances, the DP can be solved using an outside or off-board system, with the resulting optimal macro-scale SOC profile and PSR levels being transferred wirelessly to the control system 200.

Figure 8:
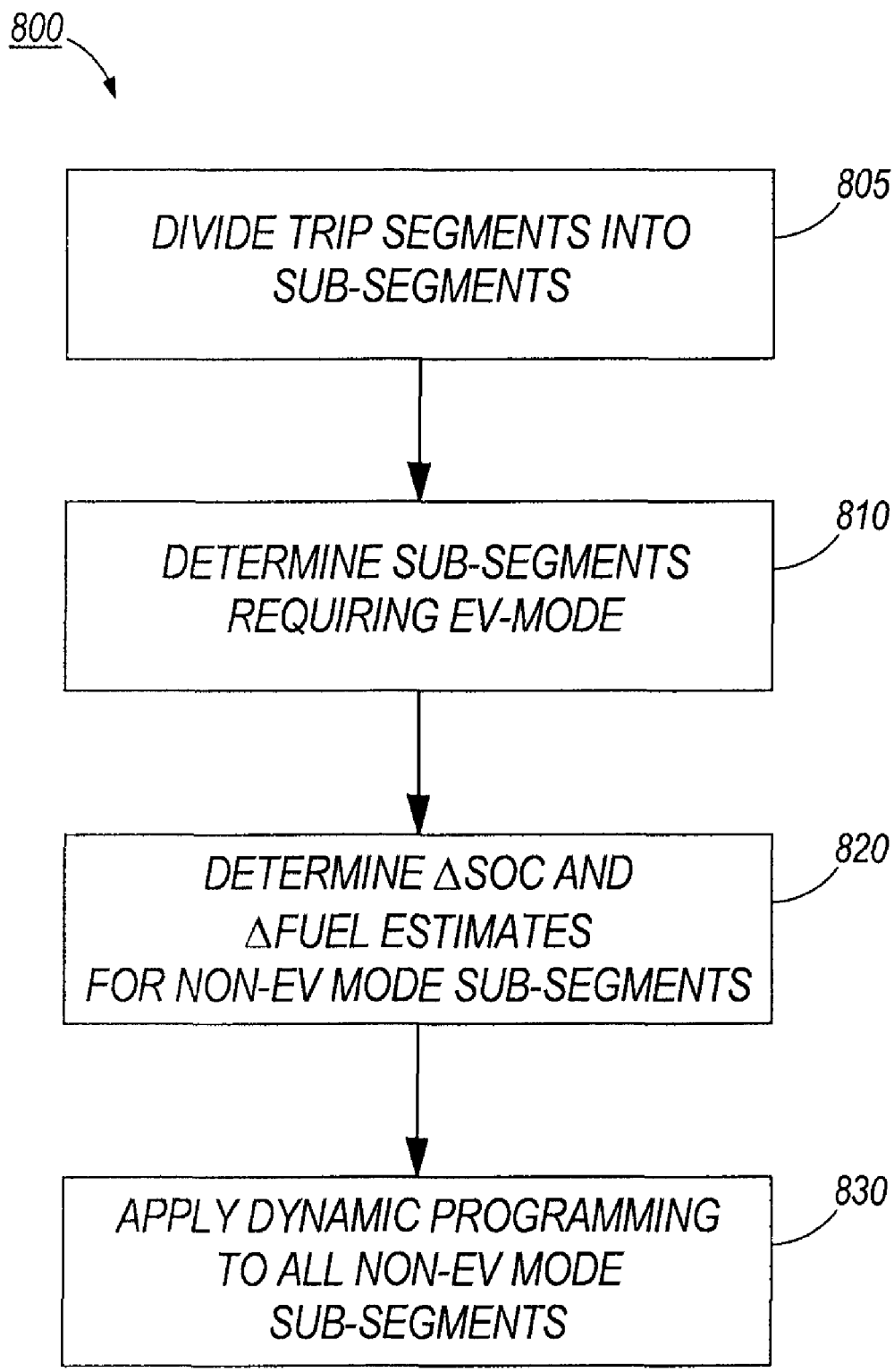
FIG. 8 illustrates an exemplary process for simplified dynamic programming in the spatial domain according to an embodiment of the invention.

In another embodiment, the macro-scale optimal SOC profile can be determined in step 415 in the spatial domain using a simplified DP approach. This simplified DP approach is illustrated in FIG. 8 and is less computationally complex than the time-domain approach. Thus, the simplified DP approach is more easily computed using on-board vehicle systems, such as control system 200.

The simplified DP approach used to obtain the macro-scale SOC profile (step 415) is depicted in FIG. 8. The control system first divides each segment into sub-segments of approximately the same length (step 805). The control system then analyzes the driving cycle produced through trip modeling to determine which sub-segments of the trip include significant acceleration or deceleration (step 810). The vehicle will operate in an electric vehicle (EV) mode for these sub-segments. In the EV mode, the PSR ratio is chosen such that electric motor satisfies 100% of the vehicle's propulsion needs and the ICE provides no power (i.e., PSR=0). The control system 200 will also determine the estimated change in SOC (ΔSOC) for the EV mode sub-segments, (change in fuel (Δfuel) will be zero). A look-up-table (LUT) populated with estimates of ΔSOC based on the driving cycle's acceleration and deceleration estimates of the EV mode segments can be used to estimate ΔSOC.

In step 820, the control system 200 analyzes the non-EV mode sub-segments of the trip to determine an estimated ΔSOC and Δfuel for each sub-segment according to each possible value of PSR. In one embodiment, PSR is a value between 0 and 1 in $\frac{1}{10}^{th}$ increments (e.g., 0.0, 0.1, 0.2, ... 0.9, 1.0). The PSR increments can be smaller or larger in other embodiments. To determine the estimated ΔSOC and Δfuel for each sub-segment, the total power demand (speed × torque) and selected PSR is used to determine the power demand from the ICE and electric motor (for the selected PSR). The fuel rate can be found from a fuel map for the hybrid vehicle based on the average speed and the torque. The Δfuel is equal to the product of the fuel rate and the predicted driving time of the sub-segment. The ΔSOC is equal to the numerical integration for the battery dynamics within the sub-segment driving time. By ignoring the temperature effect and the internal capacitance, a simplified battery model in discrete time is:

$$SOC(k+1) = SOC(k) - \frac{V_{oc} - \sqrt{V_{oc}^2 - 4(R_{int} + R_t) \cdot T_m \cdot \omega_m \cdot \eta_m^{-sgn(T_m)}}}{2(R_{int} + R_t) \cdot Q_b}$$

where the internal resistance $R_{int}$ and the open circuit voltage $V_{oc}$ are functions of the battery SOC, $Q_b$ is the maximum battery charge, $R_t$ is the terminal resistance, and $\omega_m * \eta_m^{-sgn(T_m)}$ is the efficiency of the electric motor.

In another embodiment, a look-up-table is populated with estimated ΔSOC and Δfuel values for different sub-segment driving cycle characteristics. This eliminates the need to perform algebraic calculations in real-time, as described in the preceding paragraph. Instead, the algebraic calculations are performed before a trip occurs and stored in the look-up-table.

In step 830, after the sub-segment-wise ΔSOC and Δfuel are calculated for the non-EV mode sub-segments with all possible PSR values, DP is applied to the corresponding spatial domain optimization. DP is applied to the non-EV mode sub-segments of the trip using ($\Delta SOC_{NET}+\Delta SOC_t$) as the initial SOC value and $\Delta SOC_t$ as the terminal SOC value. $SOC_s$ is the initial SOC value for the trip (e.g., 0.8 if at the typical highest healthy SOC level) and $\Delta SOC_{NET}=SOC_s-SOC_t+$the sum of each ΔSOC for all EV-mode sub-segments.

Performing DP provides the estimated ΔSOC for each non-EV sub-segment, which can then be combined with the estimated ΔSOC for each EV sub-segment. Thus, a macro-scale SOC profile across the entire trip results, which is divided according to the original (n) segments from the trip model.

In step 420, a micro-scale SOC profile is determined for the upcoming segment (x) using DP. The DP can use an updated driving cycle resulting from step 445 that uses real-time traffic data (when available), or updates already-retrieved historic traffic data based on estimated trip times with historical traffic data based on actual/current trip times. Updating the driving cycle allows a more accurate DP solution because the driving cycle constraints are more accurate.

Also, the micro-scale DP algorithm uses updated SOC constraints to more accurately determine a micro-scale SOC profile and PSR values. During the trip, the actual ΔSOC may differ from that in the macro-scale SOC profile, as the macro-scale SOC profile is merely an estimation. For instance, the driver may brake or accelerate more or less than expected, changing the demand from the battery, and, thus, the battery's SOC at the end of a segment may not be as expected. Therefore, as discussed above with reference to FIG. 7(b), the initial SOC value used is the actual SOC at the end of the current segment (soc(i)). The terminal SOC value used is the estimated SOC level at the end of the next segment (SOC(i+1)).

Similar to the macro-scale DP algorithm, the micro-scale DP algorithm can be solved either in the time or spatial domain. However, the time domain micro-scale DP is less complex than the macro-scale DP problem; therefore, an on-board control system is more likely to be able to perform the micro-scale DP than the macro-scale DP in the time domain. The spatial domain micro-scale DP is less complex than the micro-scale DP in the time domain.

In another embodiment, pattern recognition is used to account for driver behavior that is inconsistent with the trip models' driving cycle predictions. For instance, the acceleration/deceleration rates may be higher for a more "sporty" driver (thus shorter time periods for acceleration/deceleration), or lower for a more conservative driver (thus longer time periods for acceleration/deceleration). By better predicting the transition period from an acceleration to approximate constant speed segment and from a constant speed segment to deceleration, better fuel efficiency is achieved. The pattern recognition will be applied, for example, in step 425, to more accurately transition between the EV mode and the PSR values determined via micro-scale DP for local road segments.

To determine the time to transition from an acceleration EV-mode to the DP micro-scale-determined PSR value for approximately constant speed, the following criteria is used:

1) $a < a_{threshold}$
2) $V_{lim} - V_{threshold} < V > V_{lim} + V_{threshold}$
3) Transition region: $[S_i + S_1, S_i + S_2]$ Where (a) is the acceleration rate of the vehicle, ($a_{threshold}$) is the threshold value of the transition, ($V_{lim}$) is the speed limit of the segment, ($S_i$) is the location of the (i-$^{th}$) traffic stop, ($S_1$) is the lower bound of the transition region, and ($S_2$) is the upper bound of the transition region.

To determine the time to transition from the DP micro-scale-determined PSR value for approximately constant speed to a deceleration EV-mode to, the following criteria is used:

1) $b < b_{threshold}$
2) $V_{lim} - V_{threshold} < V < V_{lim} + V_{threshold}$
3) Transition region: $[S_{i+1} - S_3, S_{i+1}]$ Where (b) is the deceleration/braking rate of the vehicle, ($b_{threshold}$) is the threshold value of the transition, ($V_{lim}$) is the speed limit of the segment, ($S_{i+1}$) is the location of the (i+1-$^{th}$) traffic stop, and ($S_3$) is the lower bound of the transition region.

Thus, the invention provides, among other things, systems and methods of determining and applying power split ratios to power sources within hybrid vehicles to improve fuel efficiency and battery usage. Various features and advantages of the invention are set forth in the following claims.

The invention claimed is:

1. A hybrid vehicle comprising:
   a drive train;
   an electric power source coupled to the drive train and including an electric energy storage device having a state-of-charge;
   a non-electric power source coupled to the drive-train; and
   a control system for controlling the transfer of power from the electric power source and the non-electric power source to the drive train over a defined trip route, the control system comprising software stored on a computer readable medium for effecting the steps of:
      generating a macro-scale state-of-charge profile for the state-of-charge over the defined trip route by:
         dividing the trip route into a series of trip segments,
         dividing each trip segment into a series of sub-segments,
         identifying as electric-only sub-segments that include an amount of acceleration or deceleration above a first threshold and hybrid sub-segments including sub-segments not identified as electric-only sub-segments,
         selecting a plurality of potential power split ratios for the hybrid sub-segments
         estimating a change in the state-of-charge
            for each said electric-only sub-segment and
            for each of the plurality of potential power split ratios for each said hybrid sub-segment, and
         performing a dynamic programming optimization to determine a macro-scale estimated change in the state-of-charge for each said hybrid sub-segment; and
      controlling a power split ratio between the electric power source and the non-electric power source for the defined trip route based on the macro-scale state-of-charge profile.

2. The hybrid vehicle of claim 1, wherein estimating the change in the state-of-charge for each of the plurality of potential power split ratios for each said hybrid sub-segment includes estimating a first change in the state-of-charge for a first potential power split ratio for a first hybrid sub-segment by
   determining a total power demand over the first hybrid sub-segment for the hybrid vehicle based on a trip model of the first hybrid sub-segment;
   calculating a power demand of the electric energy storage device for the first hybrid sub-segment based on the first potential power split ratio and the total power demand;
   estimating the first change in the state-of-charge for the first potential power split ratio based on the power demand of the electric energy storage device.

3. The hybrid vehicle of claim 2, wherein the trip model is one of:
   a gas-kinetic trip model,
   a Gipps car following model,
   a neural network model,
   a traffic data trip model using historical or real-time traffic data and constant acceleration and deceleration rates, and
   a simple trip model using constant acceleration, constant deceleration, and speed limits as velocity rates.

4. A hybrid vehicle as set forth in claim 1, further comprising software stored on the computer readable medium for effecting the step of identifying one of the series of sub-segments as a ramp sub-segment, wherein the ramp sub-segment includes an entrance or exit ramp for a highway, wherein estimating a change in the state-of-charge for the ramp sub-segment includes using neural network modeling.

5. The hybrid vehicle of claim 1, wherein the control system is further operable to, during each trip segment as the hybrid vehicle traverses the trip route, generate a micro-scale state-of-charge profile for a next trip segment, wherein the micro-scale state-of-charge profile re-estimates a change in the state-of-charge over the next trip segment, which was previously estimated in the macro-scale state-of-charge profile.

6. The hybrid vehicle of claim 1, further comprising software stored on the computer readable medium for effecting the step of recognizing driving patterns at various points along the trip route as the hybrid vehicle proceeds along the trip route, and wherein identifying sub-segments as electric-only sub-segments and hybrid sub-segments is based on recognized driving patterns.

7. The hybrid vehicle of claim 1, wherein the macro-scale state-of-charge profile includes the estimated change in the state-of-charge for each said electric-only sub-segment and the macro-scale estimated change in the state-of-charge for each said hybrid sub-segment such that each trip segment of the defined trip route has an associated change in the state-of-charge estimate.

8. The hybrid vehicle of claim 1, wherein the estimated change in the state-of-charge for each said electric-only sub-segment and the macro-scale estimated change in the state-of-charge for each said hybrid sub-segment is negative to indicate a reduction in the state-of-charge of the electric energy storage device over each trip segment.

9. A method of controlling a hybrid vehicle that includes a drive train, an electric power source coupled to the drive train, and a non-electric power source coupled to the drive train, the method comprising the steps of:
retrieving trip data;
determining a trip route based on the trip data;
dividing, by a controller of the hybrid vehicle, the trip route into (n) segments;
modeling, by the controller, each of the (n) segments of the trip route to determine a driving cycle along the trip route for the hybrid vehicle;
dividing, by the controller, each of the (n) trip segment into a series of sub-segments;
identifying, by the controller, as electric-only sub-segments that include an amount of acceleration or deceleration above a first threshold and hybrid sub-segments including sub-segments not identified as electric-only sub-segments;
selecting a plurality of potential power split ratios for the hybrid sub-segments;
estimating, by the controller, a change in the state-of-charge
for each said electric-only sub-segment and
for each of the plurality of potential power split ratios for each said hybrid sub-segment;
performing, by the controller, a dynamic programming optimization to determine a macro-scale estimated change in the state-of-charge for each said hybrid sub-segment;
generating a macro-scale state-of-charge profile based on the estimated change in the state-of-charge for each said electric-only sub-segment and the macro-scale estimated change in the state-of-charge for each said hybrid sub-segment; and controlling a power split ratio between the electric power source and the non-electric power source of the hybrid vehicle based on the macro-scale state-of-charge profile.

10. The method of claim 9, wherein estimating the change in the state-of-charge for each of the plurality of potential power split ratios for each said hybrid sub-segment includes estimating a first change in the state-of-charge for a first potential power split ratio for a first hybrid sub-segment by
determining a total power demand for the hybrid vehicle based on a trip model of the first hybrid sub-segment;
calculating a power demand of the electric energy storage device for the first hybrid sub-segment based on the first potential power split ratio and the total power demand;
calculating the first change in the state-of-charge for the first potential power split ratio based on the power demand of the electric energy storage device.

11. The method of claim 10, wherein the trip model is one of:
a gas-kinetic trip model,
a Gipps car following model,
a neural network model,
a traffic data trip model using historical or real-time traffic data and constant acceleration and deceleration rates, and
a simple trip model using constant acceleration, constant deceleration, and speed limits as velocity rates.

12. The method of claim 9, further comprising identifying one of the series of sub-segments as a ramp sub-segment, wherein the ramp sub-segment includes an entrance or exit ramp for a highway, wherein estimating a change in the state-of-charge for the ramp sub-segment includes using neural network modeling.

13. The method of claim 9, wherein the control system is further operable to, during each trip segment as the hybrid vehicle traverses the trip route, generate a micro-scale state-of-charge profile for a next trip segment, wherein the micro-scale state-of-charge profile re-estimates a change in the state-of-charge over the next trip segment, which was previously estimated in the macro-scale state-of-charge profile.

14. The method of claim 9, further comprising recognizing driving patterns at various points along the trip route as the hybrid vehicle proceeds along the trip route, and wherein identifying sub-segments as electric-only sub-segments and hybrid sub-segments is based on recognized driving patterns.

15. The method of claim 9, combining the estimated change in the state-of-charge for each said electric-only sub-segment and the macro-scale estimated change in the state-of-charge for each said hybrid sub-segment to generate the macro-scale state-of-charge profile with each trip segment of the defined trip route having an associated change in the state-of-charge estimate.

16. The method of claim 9, wherein the estimated change in the state-of-charge for each said electric-only sub-segment and the estimated change in the state-of-charge for each said hybrid sub-segment is negative to indicate a reduction in the state-of-charge of the electric energy storage device over each trip segment.

17. The method of claim 9, wherein the step of identifying, by the controller, as electric-only sub-segments that include an amount of acceleration or deceleration above a first threshold is based on an analysis of the driving cycle.

18. A hybrid vehicle comprising:
a drive train;
an electric power source coupled to the drive train and including an electric energy storage device having a state-of-charge;

a non-electric power source coupled to the drive-train; and a control system for controlling the transfer of power from the electric power source and the non-electric power source to the drive train over a defined trip route, the control system operable to:

generate a macro-scale state-of-charge profile for the state-of-charge over the defined trip route by:

dividing the trip route into a series of trip segments, dividing each trip segment into a series of sub-segments, identifying as electric-only sub-segments that include an amount of acceleration or deceleration above a first threshold and hybrid sub-segments including sub-segments not identified as electric-only sub-segments, estimating a change in the state-of-charge
for each said electric-only sub-segment and
for each of the plurality of potential power split ratios for each said hybrid sub-segment, and performing an optimization to determine a macro-scale estimated change in the state-of-charge for each said hybrid sub-segment; and control a power split ratio between the electric power source and the non-electric power source over the defined trip route according to the macro-scale state-of-charge profile.

19. The hybrid vehicle of claim 18, wherein estimating the change in the state-of-charge for each of the plurality of potential power split ratios for each said hybrid sub-segment includes estimating a first change in the state-of-charge for a first potential power split ratio for a first hybrid sub-segment by determining a total power demand over the first hybrid sub-segment for the hybrid vehicle based on a trip model of the first hybrid sub-segment;

calculating a power demand of the electric energy storage device for the first hybrid sub-segment based on the first potential power split ratio and the total power demand;

estimating the first change in the state-of-charge for the first potential power split ratio based on the power demand of the electric energy storage device.

20. The hybrid vehicle of claim 19, wherein the trip model is one of:
a gas-kinetic trip model,
a Gipps car following model,
a neural network model,
a traffic data trip model using historical or real-time traffic data and constant acceleration and deceleration rates, and
a simple trip model using constant acceleration, constant deceleration, and speed limits as velocity rates.

21. A hybrid vehicle as set forth in claim 18, wherein the control system is further operable to identify one of the series of sub-segments as a ramp sub-segment, wherein the ramp sub-segment includes an entrance or exit ramp for a highway, wherein estimating a change in the state-of-charge for the ramp sub-segment includes using neural network modeling.

22. The hybrid vehicle of claim 18, wherein the control system is further operable to, during each trip segment as the hybrid vehicle traverses the trip route, generate a micro-scale state-of-charge profile for a next trip segment, wherein the micro-scale state-of-charge profile re-estimates a change in the state-of-charge over the next trip segment, which was previously estimated in the macro-scale state-of-charge profile.

23. The hybrid vehicle of claim 18, wherein the control system is further operable to recognize driving patterns at various points along the trip route as the hybrid vehicle proceeds along the trip route, and wherein identifying sub-segments as electric-only sub-segments and hybrid sub-segments is based on recognized driving patterns.

24. The hybrid vehicle of claim 18, wherein the macro-scale state-of-charge profile includes the estimated change in the state-of-charge for each said electric-only sub-segment and the macro-scale estimated change in the state-of-charge for each said hybrid sub-segment such that each trip segment of the defined trip route has an associated change in the state-of-charge estimate.

25. The hybrid vehicle of claim 18, wherein the estimated change in the state-of-charge for each said electric-only sub-segment and the macro-scale estimated change in the state-of-charge for each said hybrid sub-segment is negative to indicate a reduction in the state-of-charge of the electric energy storage device over each trip segment.

* * * * *